(12) United States Patent
Højris et al.

(10) Patent No.: US 11,434,875 B2
(45) Date of Patent: Sep. 6, 2022

(54) BRACKET AND TRANSPORT FRAME FOR A HUB OF A WIND TURBINE

(71) Applicant: Siemens Gamesa Renewable Energy A/S, Brande (DK)

(72) Inventors: Anders Elsborg Højris, Herning (DK); Henning Poulsen, Skjern (DK); Witold Zareba, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 219 days.

(21) Appl. No.: 16/800,153

(22) Filed: Feb. 25, 2020

(65) Prior Publication Data
US 2020/0271102 A1 Aug. 27, 2020

(30) Foreign Application Priority Data
Feb. 26, 2019 (EP) ..................... 19159396

(51) Int. Cl.
*F03D 13/40* (2016.01)
*F03D 80/00* (2016.01)
*B65D 19/44* (2006.01)

(52) U.S. Cl.
CPC ............. *F03D 13/40* (2016.05); *F03D 80/00* (2016.05); *B65D 19/44* (2013.01); *F05B 2260/02* (2013.01)

(58) Field of Classification Search
CPC .......... F03D 13/40; F03D 80/00; F03D 13/00; B66F 19/00; B60P 7/13; B66C 1/108; F05B 2260/02
See application file for complete search history.

(56) References Cited

U.S. PATENT DOCUMENTS

2011/0132239 A1  6/2011  Poulsen et al.

FOREIGN PATENT DOCUMENTS

| CN | 203727937 U | 7/2014 |
|----|-------------|--------|
| CN | 204677375 U | 9/2015 |
| CN | 205207053 U | 5/2016 |
| CN | 207064153 U | 3/2018 |
| CN | 208377510 U | 1/2019 |
| CN | 209177237 U | 7/2019 |
| CN | 209275238 U | 8/2019 |
| WO | 2015024590 A1 | 2/2015 |

OTHER PUBLICATIONS

Extended European Search Report in related European Patent Application No. 19159396.1, dated Aug. 20, 2019. 7 pages.

*Primary Examiner* — Aaron R Eastman
(74) *Attorney, Agent, or Firm* — Schmeiser, Olsen & Watts LLP

(57) ABSTRACT

A bracket for a transport frame, configured to hold a hub of a wind turbine in place at the transport frame during transport of the hub, the bracket holding the hub during the transport of the hub and mechanically connecting a holding device and the transport frame for attaching the holding device at the transport frame, for moving the holding device relative to the transport frame, and for moving a contacting portion of the holding device against the hub, which is arranged in a predetermined position on the transport frame is provided. A transport frame is also provided that includes, at least one bracket.

9 Claims, 3 Drawing Sheets

BRACKET AND TRANSPORT FRAME FOR A HUB OF A WIND TURBINE

CROSS-REFERENCE TO RELATED APPLICATIONS

This application claims priority to European Patent Application No. EP 19159396.1, having a filing date of Feb. 26, 2019, the entire contents of which are hereby incorporated by reference.

FIELD OF TECHNOLOGY

The following relates to a bracket for a transport frame, configured to hold a hub of a wind turbine in place at the transport frame during transport of the hub. Further, the following relates to a transport frame for holding a hub of a wind turbine in place during transport of the hub.

BACKGROUND

The transport of large wind turbine components such as a hub by lorry or other earth-bound vehicles is usually quite complicated. Due to the large load, in particular the weight of the hub, it is usually necessary to use cranes in order to load or unload the hub onto or down from such vehicles. Such loading or unloading by crane makes the procedure very complicated and also expensive.

In addition, it is necessary to ensure that the height of the means of transport combined with the height of the transported load does not exceed certain height limits which are due to bridges and/or tunnels that are to be passed on the way. Reduction of combined height is thus a very important task.

In prior art it is known to store a wind turbine hub on four loose wooden beams. The hub is supported on the four wooden beams during road transport and connected to the trailer by lashing. Also, during sea transportation, the hub is supported on four wooden beams and lashed down to the ship deck. The hub is delivered without spinner nose thus enabling to connect lifting gear in the top of the hub. Rigger people need to use a ladder to climb to the top of the hub to connect and disconnect the hub. A typical hub is lifted 12-17 times from leaving the factory to the installation site. Just before lifting the rotor onto the turbine, the spinner nose is installed on the hub.

Further, it is known to place the hub in a specific transport frame, which is provided as form-fit as possible to the hub. Here, a gap between transport frame and hub is closed with shimming plates after the hub is arranged on the transport frame. A residual gap of about 2 mm was accounted for in the design of vertical bolts. This leads, however, to the problem that the hub is able to move around these 2 mm and produces paint damages on a supporting surface of the hub. If the hub is stopped by the shimming plates, these paint damages on a side of the hub may occur as well.

SUMMARY

An aspect relates to address at least part of the above-mentioned problems. In particular, it is an embodiment of the present invention to provide a bracket and a transport frame comprising such bracket for an improved transport of a wind turbine hub.

The features and details of the embodiment of the present invention result from the claims, the description and the figures. Features and details discussed with respect to the inventive bracket are also correlated with the inventive transport frame and the other way around.

According to a first aspect of the present invention, a bracket for a transport frame, configured to hold a hub of a wind turbine in place at the transport frame during transport of the hub, is provided. The bracket includes holding means for holding the hub during the transport of the hub and tensioning means mechanically connectable with the holding means and the transport frame for attaching the holding means at the transport frame, for moving the holding means relative to the transport frame, and for moving a contacting portion of the holding means against the hub, which is arranged in a predetermined position on the transport frame.

By means of the inventive bracket and the tensioning means as well as the holding means in particular, the hub can be fastened to the transport frame in an easy and secure manner. As soon as the hub is placed onto a supporting main body of the transport frame, the holding means, which is or are released at this time, can be tensioned and/or engaged by the tensioning means. That is, the holding means can be moved onto and pressed against the hub by mechanically connecting the tensioning means to the transport frame as well as the holding means and further operating the tensioning means. Operating the tensioning means can be done in different ways, depending on the specific embodiment of the tensioning means. Since movement of the hub during transport can be prevented, impact loads onto the hub and/or the transport system by a moving hub can be prevented as well.

Using the holding and the tensioning means, mounting and demounting of the hub is safer than using the common shimming elements.

The inventive bracket can be attached moveably to a main body of the transport frame. In accordance with an embodiment of the present invention, the bracket may be part of the transport frame or can be provided as an own part next to the transport frame. That is, by means of the bracket, already existing transport frames can be modified to provide the inventive function to securely hold the hub at the transport frame. For this, only a specific mounting portion has to be provided at the transport frame, to which the holding means can be attached by means of the tensioning means.

Attaching the holding means to the transport frame can be understood as attaching or fixing the holding means in at least one, in two directions at the transport frame or a main body thereof. That is, when the holding means is attached to the main body of the transport frame by mechanically connecting it with the tensioning means, the holding means can be moved and/or shifted in only one direction at the main body without destroying the holding means.

While operating the tensioning means, the holding means and the contacting portion in particular can be moved, pressed against the hub, which is located at the predetermined position at the transport frame. In order to prevent damage or destruction of the hub, the contacting portion is configured to be located parallel to a counter contacting portion of the hub, against which the contacting portion of the base portion will be pressed, when the hub is placed in the predetermined position.

The bracket may comprise one or more holding means, one or more tensioning means as well as one or more contacting portions. That is, the bracket is not restricted to one single body. Also, the holding means is not limited to one single body either, even though it is provided or essentially provided as one single body.

The hub shall be understood as a hub for a wind turbine, to which the blades of the wind turbine are connected when the wind turbine is operated.

Moreover, the bracket may be configured such that the contacting portion may be at least partially made of synthetic, elastically deformable, material. That is, there may be a protection portion at the contacting portion, which is made of synthetic material like plastic, rigid plastic, and/or an elastically deformable material in order to protect the hub from scratches or the like. The synthetic and/or plastic part may be screwed to the base portion of the holding means, wherein the heads of the screws are recessed into the synthetic part. In this way, scratching of the hub by the screws can be prevented. In addition or alternatively, there may also be a synthetic part at the contacting portion, wherein the synthetic part is glued to the desired contacting surface of the base portion.

According to another embodiment of the present invention, a bracket may be provided, wherein the holding means includes an L-shaped or essentially L-shaped base portion with an attaching portion for the mechanical connection with the tensioning means and the contacting portion. This shape of the base portion has turned out as a space saving and still durable solution for holding the hub in the desired position. The L-shape of the base portion can be understood such that at least a cross-section of the base portion is L-shaped or essentially L-shaped. An L-shape can be understood as a shape having two leg portions extending orthogonally to each other. The contacting portion is arranged at an inside of the L-shaped base portion. An inside of the L-shaped base portion is an area of the base portion, where two surfaces of the base portion face each other with an angle of about 90 degrees between the two surfaces. It is further, that the contacting portion is located at an inside of a leg of the L-shaped base portion, which extends in gravitational direction or essentially in gravitational direction when mounted to the transport frame and/or the main body of the transport frame. The attaching portion can be understood as a portion, by means of which the holding means will be attached to the transport frame and the main body of the transport frame, respectively. That is, the attaching portion may not necessarily be attached to the transport frame and/or the main body of the transport frame directly. The contacting portion is designed on one surface of the base portion only.

Further, tensioning means of an inventive bracket may comprise at least one screw to be screwed into the holding means for attaching the holding means at the transport frame, for moving the holding means relative to the transport frame, and/or for moving the contacting portion of the holding means against the hub as soon as the hub is placed in a predetermined position on the transport frame. When using a screw or screws as the tensioning means, the holding means can be attached and adjusted at the base portion in an easy and cost-efficient manner. Screws can be easily adjusted, thus respectively adjusting the relative position of the holding means to the transport frame. For example, by screwing the screw further into the holding means and the attaching portion in particular, the holding means will be moved towards the hub, while it is supported at a fixed position at the transport frame. By screwing the screw out of the holding means, the holding means will be moved away from the hub. In an exemplary embodiment, the tensioning means includes two screws. The two screws are located parallel to each other and are both arranged to be mechanically connected to and/or screwed into the holding means. The attaching portion may provide a screw thread for each screw. The screws and means for operating the screws can be provided as standard tools. Hence, the bracket can be provided with low costs and the use of the same is easy.

In addition, in a bracket according to the embodiment of the present invention, the base portion may comprise a stabilization means receiving part to receive stabilization means of the bracket to stabilize the holding means at the transport frame when the holding means is pressed against the hub, wherein the stabilization means receiving part is configured to receive the stabilization means in a direction perpendicular to a moving direction of the contacting portion against the hub. With regard to a position of the bracket mounted to the transport frame, the tensioning means can be regarded as horizontal fastening means applying horizontal loads to the holding means, wherein the stabilization means can be regarded as vertical fastening means applying vertical loads to the holding means. While the tensioning means prevent the holding means from sliding, the stabilization means can prevent the holding means from tilting, for example. In an exemplary embodiment, the stabilization means includes at least one, two screws to be screwed into the stabilization means receiving part, which may respectively comprise related screw threads.

Furthermore, in a bracket according to another embodiment of the present invention, the L-shaped or essentially L-shaped base portion may comprise a wedge-shaped receiving portion at an end section of the base portion for guiding the hub into position at the transport frame. The wedge-shaped receiving portion can be easily built at one upper end of the L-shaped base portion. By means of the receiving portion, the hub can be guided in the desired position, while the risk of damaging the hub at a sharp edge of the bracket and/or the transport frame can be reduced. The wedge-shaped receiving portion can be understood as a ramp-shaped receiving portion. On the wedge and/or ramp, there may be provided a protection portion as described above.

According to another aspect of the invention, there is provided a transport frame for holding a hub of a wind turbine in place during transport of the hub, wherein the transport frame includes at least one bracket as described in detail above. Therefore, the inventive transport frame brings up the same advantages that have been discussed in detail with respect to the inventive bracket. The transport frame may comprise a ring-shaped or essentially ring-shaped main body, wherein at least one bracket, a plurality of brackets is arranged at an outer and/or upper surface of the main body. Specifically, the main body may comprise a ring-shaped or essentially ring-shaped supporting portion for supporting the hub on the transport frame, wherein the ring-shaped supporting portion includes at least one break or interruption for the at least one bracket. In accordance with an inventive transport frame, the bracket or at least part of the bracket like the holding means and/or the tensioning means are detachable from the main body of the transport frame in a non-destructive way, like with the above described screwing mechanism. The contacting portion of the holding means is configured to be pressed against the hub with a predetermined contact pressure by operating the tensioning means.

According to another embodiment of the present invention, the transport frame may comprise the above described main body as well as a mounting portion, wherein the mounting portion is attached to the main body, and wherein the tensioning means is provided to be mechanically connectable with the holding means and the mounting portion for attaching the holding means at the transport frame. That is, the holding means will be mounted to the mounting portion by means of the tensioning means for fastening the hub. The mounting portion can be welded or screwed to the main body. The mounting portion is integrally connected with the main body, i.e., the mounting portion can be manufactured together with the main body as a monolithic part of the main body. This provides a cost efficient and durable mounting portion for the bracket.

Moreover, the base portion of a transport frame of the embodiment of the present invention may comprise a guiding part that is flush-mount to a counter guiding part of the main body when moving the base portion and/or the contacting portion of the holding means against the hub. Hence, the guiding part may work as a simple and reliably working guiding to move the holding means in the desired direction. In an exemplary embodiment, the guiding part is configured as a simple, plane guiding surface. However, it would also be of further advantage when the guiding part and/or the counter guiding part comprise an undercut guiding part or the like for providing an even more reliable guiding. The guiding part is arranged at an outer surface of the L-shaped base portion, at a surface of the base portion facing in gravitational direction when attached to the transport frame.

In a further embodiment of an inventive transport frame it is possible that the main body includes a ring-shaped or essentially ring-shaped supporting portion for supporting the hub on the transport frame, wherein a normal vector of the supporting portion and/or a supporting surface of the supporting portion extends orthogonally to a normal vector of the contacting portion and/or a contacting surface of the contacting portion. Thus, the hub can be fixed against movement in two or three dimensions and thus reliably fastened at the transport frame. In order to fix the hub against movement in three dimensions, it is preferred that the transport frame includes a plurality of brackets, which may be located in similar distances from each other at the ring-shaped supporting portion and main body, respectively. As already described above, the ring-shaped supporting portion does not have to be continuously ring-shaped, but may have interruptions, in or at which the brackets are arranged.

BRIEF DESCRIPTION

Some of the embodiments will be described in detail, with reference to the following figures, wherein like designations denote like members, wherein.

DETAILED DESCRIPTION

Figure 1:
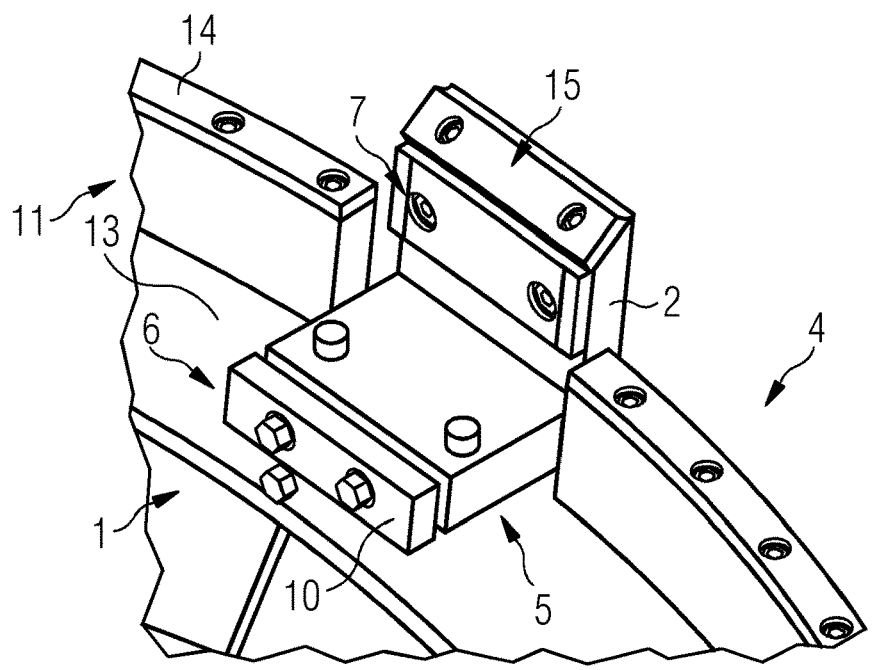
FIG. 1 depicts a perspective view of a bracket according to an exemplary embodiment of the present invention.

FIG. 1 shows a bracket 1 for a transport frame 4, configured to hold a hub 3 of a wind turbine in place at the transport frame 4 during transport of the hub 3. The bracket 1 includes holding means 5 for holding the hub 3 during the transport of the hub 3 and tensioning means 6 mechanically connectable with the holding means 5 and the transport frame 4 for attaching the holding means 5 at the transport frame 4, for moving the holding means 5 relative to the transport frame 4, and for moving a contacting portion 7 of the holding means 5 against the hub 3, which is arranged in a predetermined position on the transport frame 4.

As further shown in FIG. 1, the main body 11 includes a ring-shaped supporting portion 14 for supporting the hub 3 on the transport frame 4, wherein a normal vector of the supporting portion 14 extends orthogonally to a normal vector of the contacting portion 7. Specifically, the normal vector of the supporting portion 14 extends vertically and the normal vector of the contacting portion 7 extends horizontally. That is, a supporting surface of the supporting portion is arranged orthogonally to a contacting surface of the contacting portion 7.

Figure 2:
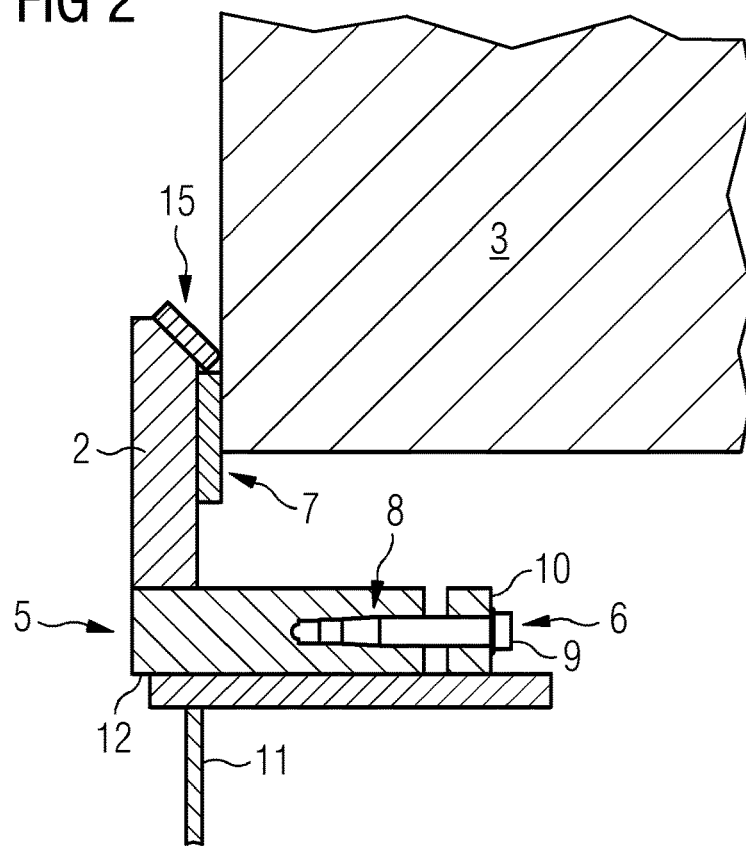
FIG. 2 depicts a sectional side view of the bracket according to an exemplary embodiment of the present invention.

According to the embodiment shown in FIG. 1 and FIG. 2, the holding means 5 includes an L-shaped base portion 2 with an attaching portion 8 for the mechanical connection with the tensioning means 6 and the contacting portion 7. Specifically, the tensioning means 6 includes two screws 9 to be screwed into the holding means 5 for attaching the holding means 5 at the transport frame 4, for moving the holding means 5 relative to the transport frame 4, and for moving the contacting portion 7 of the holding means 5 against the hub 3 as soon as the hub 3 is placed in a predetermined position on the transport frame 4.

Further, the L-shaped base portion 2 includes a wedge-shaped receiving portion 15 at an upper end section of the base portion 2 for guiding the hub 3 into position at the transport frame 4.

As can be further drawn from FIG. 1 and FIG. 2, the transport frame 4 includes a main body 11 with a mounting portion 10, wherein the mounting portion 10 is attached to the main body 11, and wherein the tensioning means 6 is provided to be mechanically connectable with the holding means 5 and the mounting portion 10 for attaching the holding means 5 at the transport frame 4. Specifically, the mounting portion 10 of the shown embodiment is connected with the main body 11 in a monolithic way.

The base portion 2 includes a guiding part 12 that is flush-mount to a counter guiding part 13 of the main body 11 when moving the contacting portion 7 and thus the base portion 2 of the holding means 5 against the hub 3.

Figure 3:
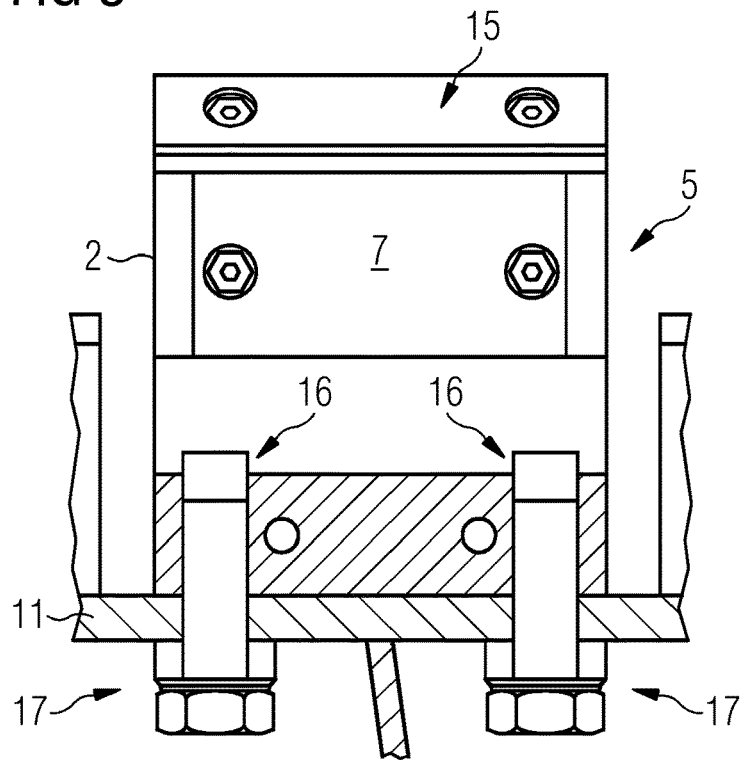
FIG. 3 depicts a sectional frontal view of the bracket according to an exemplary embodiment of the present invention.

As shown in FIG. 3, the base portion 2 includes a stabilization means receiving part 16 to receive stabilization means 17 of the bracket 1 to stabilize the holding means 5 at the main body 11 as soon as the holding means 5 is pressed against the hub 3, wherein the stabilization means receiving part 16 is configured to receive the stabilization means 17 in a direction perpendicular to a moving direction of the contacting portion 7 against the hub 3. Hence, the tensioning means 6 can be regarded as horizontal fastening means applying horizontal loads to the holding means 5, wherein the stabilization means 17 can be regarded as vertical fastening means applying vertical loads to the holding means 5. The stabilization means 17 of FIG. 3 includes two screws being screwed into suitable stabilization means receiving parts 16 in form of screw threads of the holding means 5 and the base portion 2, respectively.

Figure 4:
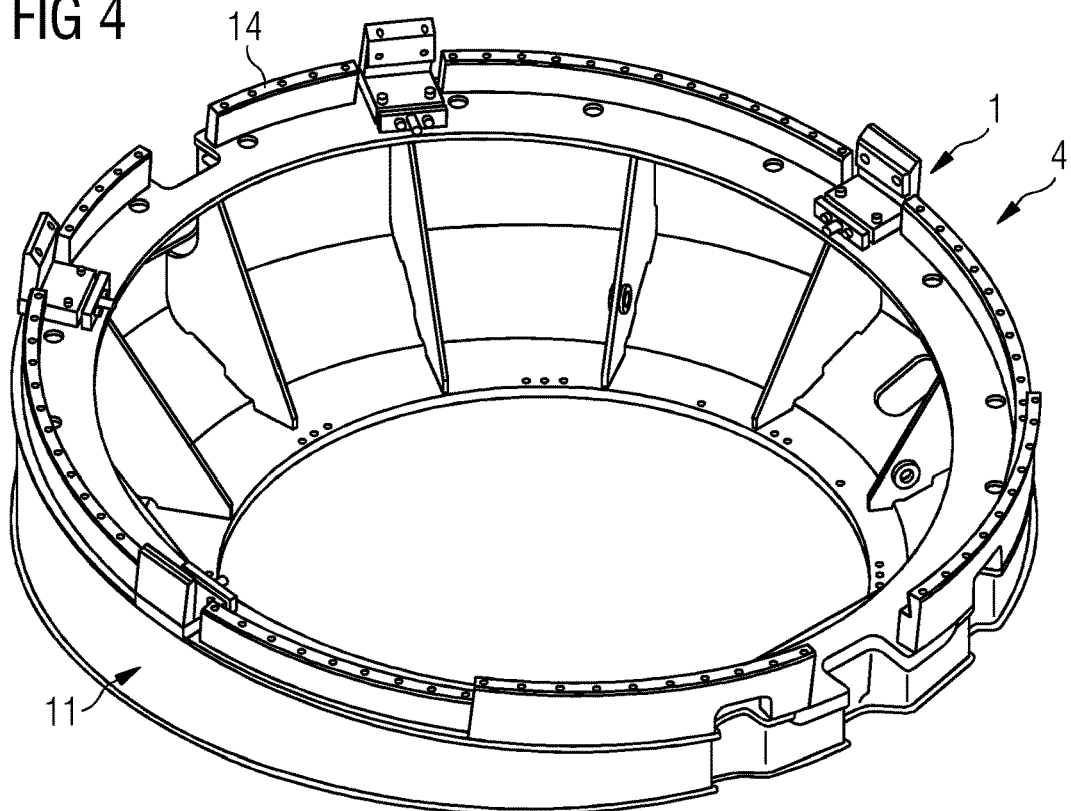
FIG. 4 depicts a perspective view of a transport frame according to an exemplary embodiment of the present invention.
Figure 5:
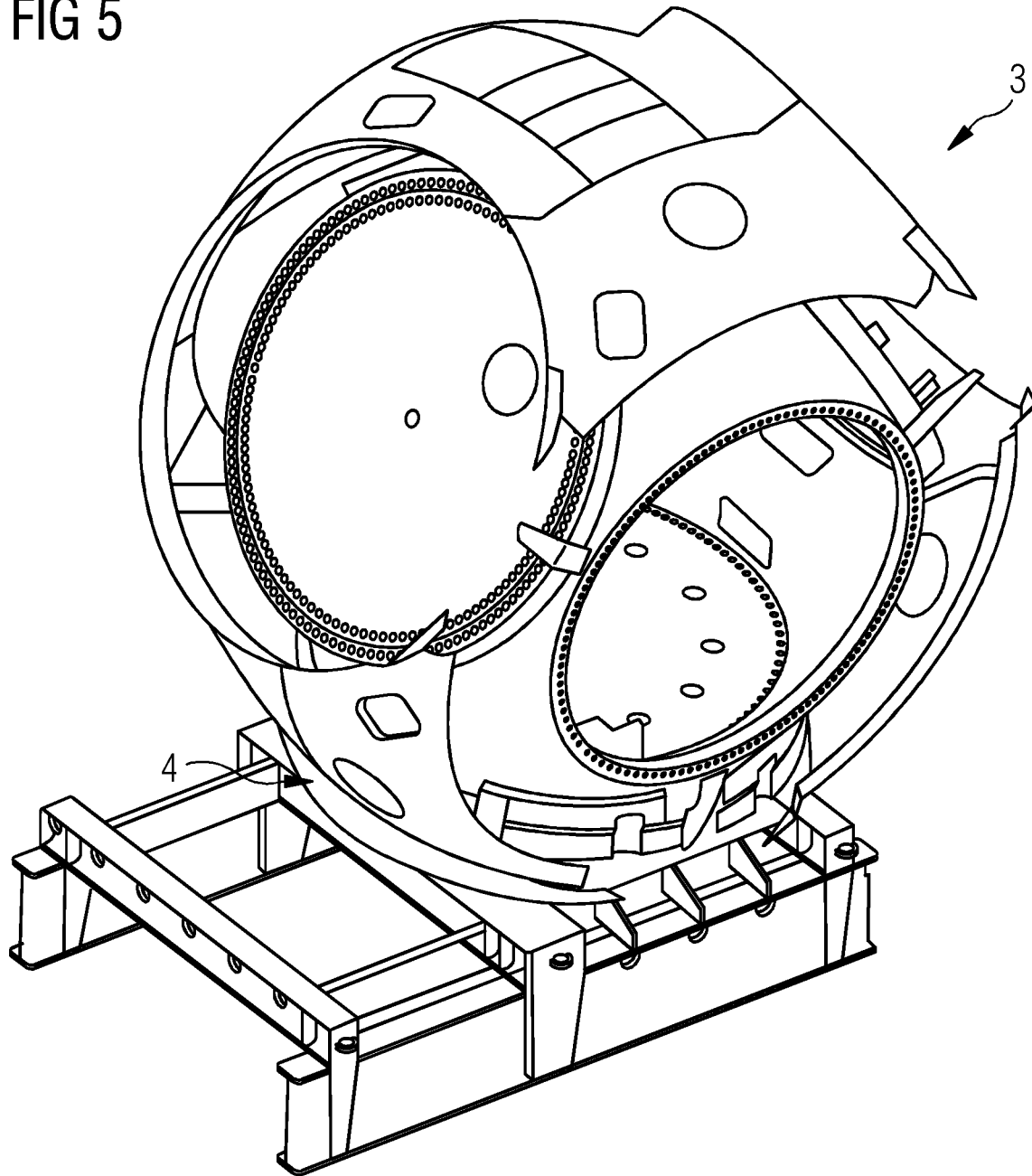
FIG. 5 depicts a perspective view of a hub on the transport frame according to an exemplary embodiment of the present invention.

FIG. 4 shows a transport frame 4 with an eccentrical recess for holding a hub 3 of a wind turbine in place during transport of the hub 3, wherein the transport frame 4 includes four brackets 1. In FIG. 5, a transport frame 5 is shown, on which a wind turbine hub 3 is mounted.

The aforesaid description of the accompanying drawings is only by the way of detail and example. Specific features of each aspect of the present invention and the figures can be combined which each other if of technical sense.

Although the present embodiment has been described in accordance with the exemplary embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A bracket for a transport frame, configured to hold a hub of a wind turbine in place at the transport frame during transport of the hub, comprising:
a holding means for holding the hub during the transport of the hub; and
a tensioning means mechanically connectable with the holding means and the transport frame for attaching the holding means at the transport frame, for moving the holding means relative to the transport frame, and for moving a contacting portion of the holding means against the hub, which is arranged in a predetermined position on the transport frame;
wherein the tensioning means comprises at least one screw to be screwed into the holding means for attaching the holding means at the transport frame, for moving the holding means relative to the transport frame, and/or for moving the contacting portion of the holding means against the hub as soon as the hub is placed in the predetermined position on the transport frame.

2. The bracket according to claim 1, wherein the holding means comprises an L-shaped or essentially L-shaped base portion with an attaching portion for the mechanical connection with the tensioning means and the contacting portion.

3. The bracket according to claim 2, wherein the base portion comprises a stabilization means receiving part to receive a stabilization means of the bracket to stabilize the holding means at the transport frame when the holding means is pressed against the hub, further wherein the stabilization means receiving part is configured to receive the stabilization means in a direction perpendicular to a moving direction of the contacting portion against the hub.

4. The bracket according to claim 2, wherein the L-shaped or essentially L-shaped base portion includes a wedge-shaped receiving portion at an end section of the base portion for guiding the hub into position at the transport frame.

5. A transport frame for holding a hub of a wind turbine in place during transport of the hub, comprising at least one bracket according to claim 2.

6. The transport frame according to claim 5, further comprising a main body with a mounting portion, wherein the mounting portion is attached to the main body, wherein the tensioning means is provided to be mechanically connectable with the holding means and the mounting portion for attaching the holding means at the transport frame.

7. The transport frame according to claim 6, wherein the mounting portion is integrally connected with the main body.

8. The transport frame according to claim 6 wherein the base portion comprises a guiding part that is flush-mount to a counter guiding part of the main body when moving the base portion and/or the contacting portion of the holding means against the hub.

9. The transport frame according to claim 6, wherein the main body comprises a ring-shaped or essentially ring-shaped supporting portion for supporting the hub on the transport frame, wherein a normal vector of the supporting portion extends orthogonally to a normal vector of the contacting portion.

* * * * *